Patented May 22, 1934

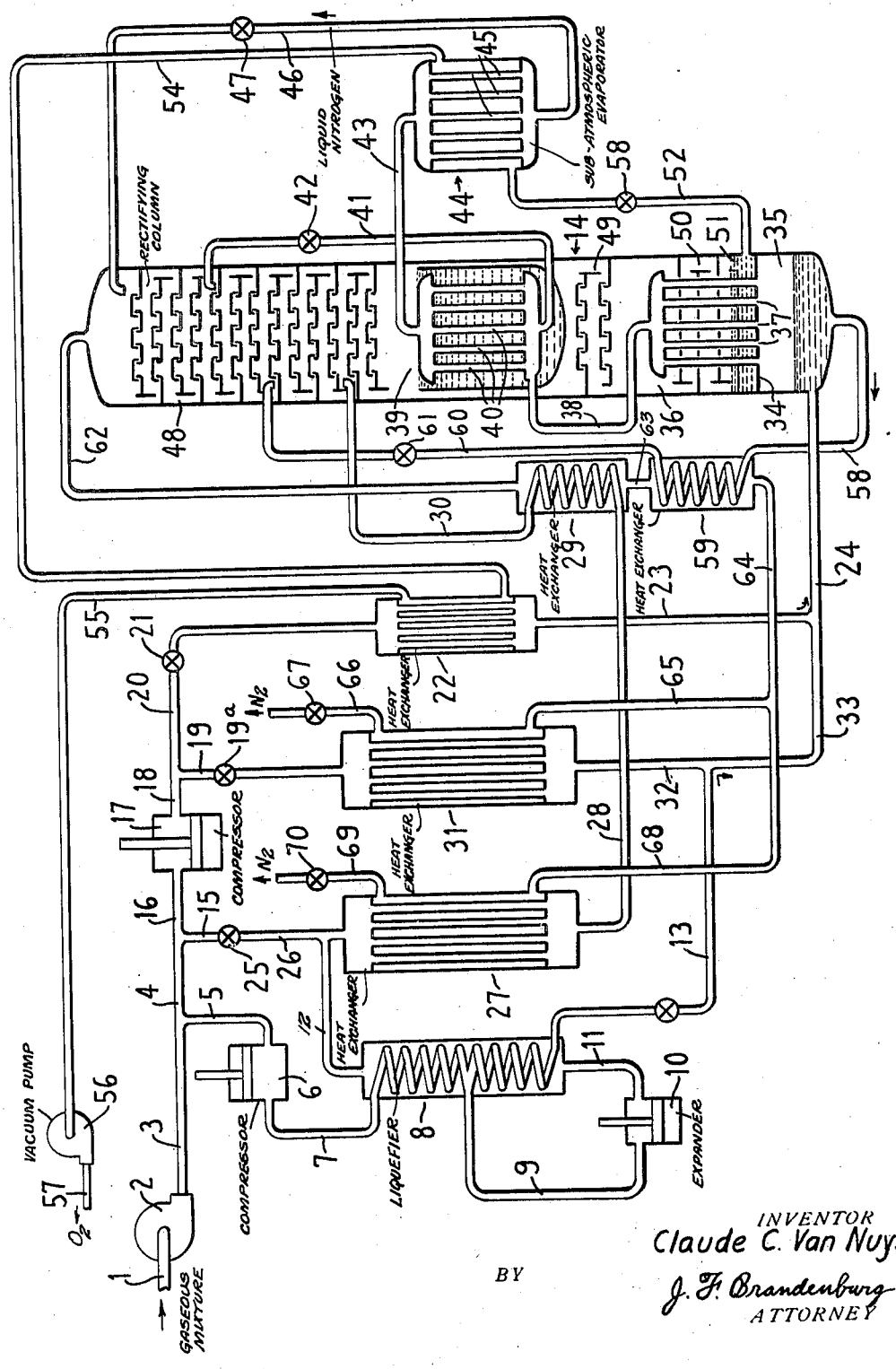

1,959,883

UNITED STATES PATENT OFFICE 1,959,883

METHOD AND APPARATUS FOR SEPARATING THE CONSTITUENTS OF GASEOUS MIXTURES

Claude C. Van Nuys, Cranford, N. J., assignor to Air Reduction Company, Incorporated, New York, N. Y., a corporation of New York Application July 16, 1932, Serial No. 622,916    REISSUED

6 Claims. (Cl. 62—175.5)

This invention relates to the liquefaction and separation of the constituents of gaseous mixtures and is particularly applicable to the recovery of oxygen and nitrogen from the atmosphere although the principles hereinafter described may be employed in separating the constituents of gaseous mixtures other than air.

The process forming the subject-matter of the invention is particularly of importance in connection with large scale oxygen production for use in metallurgical processes. In such fields the oxygen produced is not required to be of a purity comparable with that produced in any of the well-known processes for air separation, but a more important consideration for a large scale oxygen plant is the reduction of power consumption to the lowest possible figure. In fact in almost all manufacturing processes where oxygen in large quantities can be utilized, a purity of 95% or better is satisfactory.

In the well known Claude process for producing oxygen of high purity, e. g., 99½%, the separation of the constituents of air is accomplished by compression and cooling of the mixture, followed by a liquefaction in two fractions at a pressure somewhat below the initial pressure. The first liquid fraction is obtained by selective condensation in a tubular condenser employing the principle of backward return so as to obtain a liquid enriched in oxygen to which is added sufficient liquid air obtained from a separate condenser called the liquefier to make up for losses due to heat leakage.

The second fraction consisting substantially of the more volatile constituent, nitrogen, delivered at the top of the backward return tubular condenser is liquefied by indirect contact with liquids accumulated at or near the bottom of the rectification column, and delivered to the rectifier at the top level, whereas the liquid constituting the first fraction enters the rectifier at an intermediate level. This second liquid fraction, known as the "reflux" nitrogen washes the oxygen from the ascending vapors by reciprocal evaporation and condensation and this permits separation of the constituents in a substantially pure condition.

Let us assume that the tubular vaporizer in which the selective condensation takes place is sufficiently efficient so that the unliquefied gas leaving the top of the tubes is composed substantially of the more volatile constituent, nitrogen, while the enriched liquid obtained at the bottom of the condenser is a liquid of maximum possible degree of enrichment in oxygen, that is, it is that liquid which will be in phase equilibrium with the air entering the bottom of the condenser. Under these conditions, if they could be realized, it is clear that the amount of unliquefied nitrogen leaving the top of the condenser would be a maximum. If the composition in oxygen of the enriched liquid constituting the first fraction is less than the limit composition just specified, then the amount of the second fraction, that is, the unliquefied nitrogen leaving the top of the tubular vaporizer will be less.

In the normal operation of this method, the attempt is generally made to produce only that amount of nitrogen leaving the top of the vaporizer and constituting ultimately the second liquid fraction, which is necessary to deprive the vapors ascending at the level in the rectification column at which the first liquid fraction is delivered thereto, of the oxygen contained in those vapors. The degree of enrichment of the first fraction thus produced is much less than that for a liquid in phase equilibrium with unseparated air.

This being the case, it is clear that the method fails to take advantage of the maximum possible degree of oxygen enrichment attainable in accordance with the principle of condensation by backward return. On the contrary, this enrichment is carried on only to that point where the amount of reflux nitrogen is most suitable for the requirements of the subsequent rectification. This feature of the well known Claude process just described constitutes an inefficiency, the result of which is to increase very materially the cost of the oxygen produced by the method over that attainable by the improved method forming the subject-matter of this application.

It is the object of the present invention to provide a cycle whereby oxygen is produced in a very efficient manner on a large scale by removing, among others, the defect just pointed out in connection with the well known Claude cycle. It is possible to add, in the saturated vapor condition, a substantial quantity of unseparated low pressure air at an intermediate level of the upper rectifier, provided the greatest possible use is made of the principle of selective liquefaction, that is, provided the greatest possible amount of uncondensed nitrogen is removed from the top of the first tubular vaporizer or condenser, or in other words, when the enriched liquid reaching the bowl or pot below the tubular condenser is as nearly as possible enriched to the degree for phase equilibrium with unseparated air.

The unseparated air, delivered at the intermediate level of the upper rectifier, does not require any compression and it is an object of the present invention to make the quantity of air there added as great as possible.

It will be understood that all pressures herein referred to are absolute pressures, and the expressions "indirect contact" and "thermal contact" refer to heat exchanging relation, such as found in surface condensers, in which the fluids are separated by the walls of the tubes and exchange heating by conduction through these walls.

Another object of the invention is to reduce the pressure of the air entering the lower end of the tubular condenser to the lowest possible figure, this pressure being determined by the necessity of the air ascending in the tubes to be partially liquefied by the liquid oxygen, more or less pure, surrounding the tubes of said tubular condenser. In the Claude process, as above described, the uncondensed nitrogen leaving the top of the tubular condenser is subsequently liquefied in a non-selective condenser by indirect contact with liquids accumulated at the bottom or at an intermediate level of the rectification column. The liquid or reflux nitrogen thus obtained is admitted to the rectification column at the top level. In the Claude process this reflux liquid nitrogen should be as pure as possible, that is, free from oxygen, in order to prevent serious oxygen losses occurring at the top of the rectification column. Hence in the Claude process the temperature of the residual gas leaving the top of the first tubular condenser is the temperature of saturation for substantially pure nitrogen at the pressure existing in the tubes of said tubular condenser. The condensation in the tubes of the condenser is produced by indirect contact with the liquid oxygen accumulating at the bottom of the main rectifier and around the tubes, and thus the pressure necessary in the tubes is that which will cause pure nitrogen to condense in thermal contact with relatively pure oxygen at substantially atmospheric pressure.

As a further feature of the present invention, I have discovered that, by reason of new and novel features about to be described, it is possible to reduce the pressure necessary for condensation of the ascending vapors in the tubes of the tubular condenser above described. This is accomplished by making the second condenser, that is, the condenser in the Claude process in which the reflux nitrogen is liquefied, also to operate as a selective backward return condenser. This condenser constitutes the second tubular condenser in the apparatus in which my process is carried out, and is located at a higher level in the rectification column. The nitrogen which, in my process, need not be pure, leaving the top of the first tubular condenser or vaporizer enters the bottom of the tubes of the second condenser just described and is partially liquefied therein, the liquid formed draining backward to the bottom of the tubes while an uncondensed residue of high purity nitrogen leaves the top of this second condenser.

The liquid selectively condensed in the second tubular condenser is delivered to an upper level of the main rectifier above the entrance of the enriched liquid produced at the bottom of the first tubular condenser. The level of admission of this second entering liquid is not, however, at the top of the rectifier. The uncondensed nitrogen vapor leaving the top of the second tubular condenser is next passed through a non-selective third condenser, being therein liquefied non-selectively, by means about to be described, and then delivered as reflux liquid nitrogen to the top level of the main rectifier. The condensation of this latter nitrogen I accomplish by indirect contact with a quantity of liquid oxygen in amount equivalent to the oxygen product of the process, this liquid oxygen evaporating under subatmospheric pressure around the tubes of the third condenser just described. The degree of vacuum required for this condensation is relatively small but the result is to materially reduce the necessary pressure of the incoming air, since in the first tubular vaporizer or condenser it is no longer necessary to condense pure nitrogen by indirect contact with more or less pure oxygen at a pressure slightly above atmospheric.

In order that the liquids descending in the rectifier and coming in contact with the upper part of the main or first tubular condenser shall be as cold as possible, in the process forming the subject-matter of the present application, I continue the trays of the main rectification column downwardly around the tubes of the first tubular condenser so that the liquid surrounding the upper part of the tubes is colder than the pure oxygen liquid reaching the bottom of said tubes.

By reason of the novel features just described, my process reduces the necessary pressure of the air entering the first or main tubular vaporizer to a very low figure and at the same time makes it possible to add a substantially greater amount of low pressure unseparated air at an intermediate level of the upper or main rectifier. This latter result is due to two facts: First, at the lower pressure which I attain in the tubes of the first tubular condenser, the degree of enrichment attainable in the oxygen-rich liquid accumulating at the bottom of the condenser is increased since it is well known that the lower the pressure, the higher in oxygen percentage will be the liquid for phase equilibrium with unseparated air. Second, by reason of the fact that there are three liquid feeds or streams entering the main rectifier, the rectification throughout the main rectifier is more efficient in that the quantity of liquid entering at any one level in my process is less than the liquid entering at any one level of the rectifier of the Claude process where there are only two entering liquids. The reduction in the quantity of liquid entering any one level of a rectifier makes the rectification more favorable because at such a liquid entrance level the liquid descending and the vapor ascending need not be as close to phase equilibrium with each other and thus the interchange of the two constituents between the liquid and vapor is more rapid.

The preferred type of apparatus is diagrammatically illustrated in the accompanying drawing. The details of the apparatus, such as are well known to those skilled in the art, are omitted for the purpose of clarity. It is to be understood, moreover, that the invention is applicable in a variety of types of apparatus and in various modifications of the known methods of separating the constituents of gaseous mixtures.

Referring to the drawing, the gaseous mixture to be separated, such as air, enters the apparatus through a pipe 1 and into a blower 2, and thence to a pipe 3 having branches 4 and 5. A miner portion of the air passes through the pipe 5 to a compressor 6 where it is compressed and discharged through a pipe 7 to a liquefier 8. A portion of the air leaves the liquefier at an intermediate level through pipe 9 and enters an expansion machine 10, where it is expanded with the performance of external work. The air leaves the expansion machine and re-enters the liquefier 8 through a pipe 11. After passing counter-current through the liquefier it flows through a pipe 12 and joins another portion of air from the blower. The other portion of air continues on through the liquefier 8 where it is condensed and leaves as liquid through a pipe 13 to be delivered, together with the cold air from exchanger 31, to the bottom of the rectification column 14.

The portion of the air which passes through pipe 4 is divided, part passing through a pipe 15 and the rest through a pipe 16. From pipe 16 the air enters a compressor 17 wherein it is compressed to that pressure necessary for condensation in the tubes of the first tubular condenser hereinafter described. The compressed air leaves the compressor through a pipe 18, is again divided, one portion passing through a pipe 19 and valve 19a and another portion passing through a pipe 20 and valve 21. This latter portion enters a heat exchanger 22 in which it is cooled by the already-separated oxygen vapor. This cooled compressed portion of air leaves the exchanger 22 through a pipe 23 and enters the bottom of the rectification column 14 through a pipe 24.

That portion of the air entering pipe 15 passes through valve 25 and pipe 26 and after the addition of the air from pipe 12 enters a heat exchanger 27, where it is cooled by a portion of the gaseous nitrogen product. This air leaves the heat exchanger through a pipe 28 and enters a heat exchanger 29 to be further cooled by the whole of the nitrogen product coming directly from the rectification column 14. From the exchanger 29 this air passes through a pipe 30 and enters the main rectification column at an intermediate level.

That portion of air from the compressor 17 which enters the pipe 19 is cooled in a heat exchanger 31 by a portion of gaseous nitrogen product as hereinafter described. This cooled portion of air passes through a pipe 32, to a pipe 33 where it is joined by the liquid air in the pipe 13. The cooled air and liquid air flow through pipe 33, where they join the portion of cooled compressed air from exchanger 22, and thence through pipe 24 into the bottom of the rectification column.

The rectification column 14 is divided by a partition 34 into a compartment 35 communicating with a tubular condenser 36. The cold compressed air entering compartment 35 is partially liquefied in the tubular vaporizer 36 by liquid oxygen surrounding the tubes. The vapor rising through the tubes 37 of the vaporizer 36 leaves the top thereof through a pipe 38 and passes into the bottom of a second condenser 39. In rising through the tubes 40 of the backward return condenser 39, the gaseous mixture is subjected to selective liquefaction and consequent separation of the less volatile constituent, oxygen. The liquid runs backward through the tubes 40 in contact with the entering gaseous mixture to effect a further separation in accordance with the well known principles of backward return condensation. The accumulated liquid, which will be more or less impure nitrogen and may contain 15%, more or less, of oxygen, passes through a pipe 41 and pressure-reducing valve 42 to the upper part of the main rectifier at a level well above the entrance of the enriched liquid produced at the bottom of the first tubular condenser 36. High purity uncondensed nitrogen, containing less than about 1% oxygen, leaves the top of the second tubular condenser 39 through a pipe 43 and passes through a third condenser 44 in which it is liquefied in toto by indirect contact with the liquid oxygen evaporating at sub-atmospheric pressure around the tubes 45 of the condenser 44. The nitrogen which condenses at the bottom of this condenser 44 is led through pipe 46 and pressure-reducing valve 47 to the top of the main rectifier, i. e., above the entering level of the reflux liquid from the second condenser 39. The liquid flows downwardly over the group of trays 48, 49 and 50 and is subjected to rectification with the resultant separation of the more volatile constituent, nitrogen, and the final accumulation of a liquid consisting of from about 90% upward to 99.5% of the less volatile constituent, oxygen, at the bottom of the compartment 51 where the oxygen surrounds the tubes 37. Oxygen of a purity of 99.5% is suitable for the present oxygen business where oxygen is used as a welding or cutting gas, whereas a purity of around 90%, or preferably 95%, is suitable for most metallurgical processes or industrial uses. The liquid oxygen is drawn off through pipe 52 and valve 58 and enters the lower part of the condenser 44 where it is evaporated at sub-atmospheric pressure to cool and condense the high purity nitrogen vapor in the tubes 45. The pure gaseous oxygen leaves the third condenser 44 through a pipe 54, passes through the heat exchanger 22 where it cools a portion of the unseparated compressed air, and leaves the apparatus through a pipe 55, vacuum pump 56 and pipe 57.

The liquid which collects in the bottom of compartment 35, as a result of the selective condensation in the tubular vaporizer 36, contains a percentage of oxygen as closely equal as possible to that of the liquid for phase equilibrium with the air entering pipe 24. This enriched liquid is drawn off through pipe 58 and enters a heat exchanger 59 in which it is cooled by the cold nitrogen product from the exchanger 29. The enriched liquid then leaves exchanger 59 through pipe 60 and pressure-reducing valve 61 to enter the main rectification column at an intermediate level, above that at which the additional uncompressed air enters and below that at which the lower reflux is added. The nitrogen product is taken from the top of the rectification column through a pipe 62 and passes first through the exchanger 29, where it cools the low pressure incoming air coming through pipe 28 and then through pipe 63 and exchanger 59, where it cools the enriched oxygen from the bottom of the column. The nitrogen leaves exchanger 59 through a pipe 64 and is divided into two parts. One part passes through a pipe 65 to the exchanger 31, where it cools a portion of the incoming compressed air, and then leaves the apparatus through a pipe 66 and valve 67. The other portion enters exchanger 27 through a pipe 68 and it cools that part of the uncompressed air entering through pipe 26 and that part entering through pipe 12. It then leaves the apparatus through a pipe 69 and valve 70.

The air compressed in compressor 6 may be compressed to any suitable pressure and after passing through exchanger 8 enters expansion engine 10 wherein it is expanded with production of external work down to a pressure only slightly above atmospheric; i. e., the pressure of the blower 2, this being only that necessary to drive the air leaving the blower through the various pipes entering and leaving the main rectifier 14. The required refrigerative effect is thus produced in a highly efficient and convenient manner.

The invention can be used with other gaseous mixtures than air. The method can be carried out with apparatus different from that illustrated, and changes in method and apparatus can be made without departing from the invention as set forth in the appended claims.

I claim:

1. The method of separating the constituents of gaseous mixtures which comprises subjecting the gaseous mixture to selective liquefaction with backward return by thermal contact with liquefied products evaporating at substantially atmospheric pressure, subjecting the unliquefied residue of the gaseous mixture to selective liquefaction at a lower temperature with backward return by thermal contact with liquefied products evaporating at substantially atmospheric pressure, subjecting the still unliquefied residue of the gaseous mixture to non-selective liquefaction at a still lower temperature by thermal contact with a liquid product of the separation evaporating at sub-atmospheric pressure, thereby producing three liquids of different composition, that of the final liquefaction being substantially the constituent of lowest boiling point, and utilizing the three liquids at different levels to rectify vapors from previously introduced portions of such liquids evaporating at substantially atmospheric pressure.

2. The method of separating the constituents of gaseous mixtures which comprises subjecting the gaseous mixtures to selective liquefaction with backward return by thermal contact with liquefied products evaporating at substantially atmospheric pressure, subjecting the unliquefied atmospheric residue of the gaseous mixture to selective liquefaction at a lower temperature with backward return by thermal contact with liquefied products evaporating at substantially atmospheric pressure, subjecting the still unliquefied residue of the gaseous mixture to non-selective liquefaction at a still lower temperature by thermal contact with a liquid product of the separation evaporating at sub-atmospheric pressure, thereby producing three liquids of different composition, that of the final liquefaction being substantially the constituent of lowest boiling point, utilizing the three liquids at different levels to rectify vapors from previously introduced portions of such liquids evaporating at substantially atmospheric pressure, and introducing at an intermediate level of the rectification a quantity of cold but previously unliquefied air including the initial constituents thereof.

3. The method of separating oxygen from air which comprises subjecting the air to selective liquefaction with backward return by thermal contact with liquefied products evaporating at substantially atmospheric pressure to obtain a liquid rich in oxygen, withdrawing vapor from said selective liquefaction in such quantities that a portion of the oxygen of the air passes therefrom along with the nitrogen, subjecting the unliquefied oxygen and nitrogen of said selective liquefaction to a second selective liquefaction at a lower temperature with backward return by thermal contact with liquefied products evaporating at substantially atmospheric pressure to obtain another oxygen-containing liquid, withdrawing substantially pure nitrogen from the zone of the second selective liquefaction, subjecting said substantially pure nitrogen to non-selective liquefaction at a still lower temperature by thermal contact with liquid oxygen of the separation evaporating at sub-atmospheric pressure, and utilizing the two oxygen-containing liquids and the liquid nitrogen at different levels to rectify vapors from previously introduced portions of such liquids evaporating at substantially atmospheric pressure.

4. The method of separating oxygen from air which comprises subjecting the air to selective liquefaction with backward return by thermal contact with liquefied products evaporating at substantially atmospheric pressure to obtain a liquid rich in oxygen, withdrawing vapor from said selective liquefaction in such quantities that a portion of the oxygen of the air passes therefrom along with the nitrogen, subjecting the unliquefied oxygen and nitrogen of said selective liquefaction to a second selective liquefaction at a lower temperature with backward return by thermal contact with liquefied products evaporating at substantially atmospheric pressure to obtain another oxygen-containing liquid, withdrawing substantially pure nitrogen from the zone of the second selective liquefaction, subjecting said substantially pure nitrogen to non-selective liquefaction at a still lower temperature by thermal contact with liquid oxygen of the separation evaporating at sub-atmospheric pressure, and utilizing the two oxygen-containing liquids and the liquid nitrogen at different levels to rectify vapors from previously introduced portions of such liquids evaporating at substantially atmospheric pressure with the liquid most enriched in oxygen being utilized at the lowest level and the liquefied nitrogen being utilized at the uppermost level.

5. The method of separating oxygen from air which comprises supplying air to a liquefaction zone at a pressure below that at which high purity nitrogen will condense in thermal contact with relatively pure liquid oxygen at substantially atmospheric pressure and then subjecting the air to selective liquefaction with backward return by thermal contact with liquefied products evaporating at substantially atmospheric pressure to obtain a liquid rich in oxygen, subjecting the unliquefied residue of the air to selective liquefaction at a lower temperature with backward return by thermal contact with liquid products evaporating at substantially atmospheric pressure to obtain oxygen-containing liquid, subjecting the still unliquefied residue of the air to non-selective liquefaction at a still lower temperature by thermal contact with liquid oxygen of the separation evaporating at sub-atmospheric pressure to obtain substantially pure liquid nitrogen, utilizing the three liquids at different levels to liquefy vapors from previously introduced portions of such liquids evaporating at substantially atmospheric pressure, and introducing at an intermediate level of the rectification a quantity of cold but previously unliquefied air including the initial constituents thereof.

6. Apparatus for the separation of oxygen from air, comprising a rectification column, a backward return condenser at the bottom of the rectification column and in contact with the liquid oxygen product of the rectification column, a second backward return condenser in an intermediate level of the rectification column in position to be cooled by the products at that level of the column, a conduit through which gases escaping from the top of the first condenser enter the lower end of the second condenser, a nitrogen condenser for receiving the uncondensed nitrogen from said second backward return condenser, a conduit for delivering nitrogen from the nitrogen condenser to the top of the rectification column, a conduit for supplying liquid oxygen product from the rectification column to the nitrogen condenser and into thermal contact with the nitrogen, and a vacuum pump connected with the nitrogen condenser for withdrawing oxygen vapor from that condenser so that the pressure on the oxygen is sub-atmospheric and the oxygen boils to refrigerate and condense the nitrogen.

CLAUDE C. VAN NUYS.